United States Patent
Cho (10) Patent No.: US 8,514,292 B2
(45) Date of Patent: Aug. 20, 2013

(54) DIGITAL PHOTOGRAPHING APPARATUS, METHOD OF CONTROLLING THE SAME, AND RECORDING MEDIUM STORING PROGRAM TO EXECUTE THE METHOD

(75) Inventor: Deok-eun Cho, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 141 days.

(21) Appl. No.: 12/959,619

(22) Filed: Dec. 3, 2010

(65) Prior Publication Data
US 2011/0134260 A1 Jun. 9, 2011

(30) Foreign Application Priority Data
Dec. 3, 2009 (KR) .................. 10-2009-0119103

(51) Int. Cl.
*H04N 5/225* (2006.01)
(52) U.S. Cl.
USPC ............... 348/220.1; 348/207.99; 348/208.99
(58) Field of Classification Search
USPC ............... 348/220.1, 207.99, 208.99, 221.1, 348/333.01, 333.11, 333.12
See application file for complete search history.

(56) References Cited

U.S. PATENT DOCUMENTS

| 2005/0093988 A1* | 5/2005 | Haas et al. ............ 348/220.1 |
| 2006/0238622 A1* | 10/2006 | Shimosato ............ 348/220.1 |
| 2010/0265357 A1* | 10/2010 | Liu et al. ............... 348/223.1 |

* cited by examiner

*Primary Examiner* — Roberto Velez
*Assistant Examiner* — Yih-Sien Kao
(74) *Attorney, Agent, or Firm* — Drinker Biddle & Reath LLP (57) ABSTRACT

A digital photographing apparatus and a method of controlling the same captures a still image in correspondence to a shutter signal input in a photographing mode, captures a moving image after the capturing of the still image is completed, and continues a photographing operation by receiving from the user a selection of the capturing of the still image or the capturing of the moving image. As such, the digital photographing apparatus may obtain a moving image even when a user attempts to capture the moving image without knowing that a photographing mode is a still image capturing mode, and may also obtain a still image at a desired moment even when the user attempts to capture the still image without knowing that the photographing mode is a moving image capturing mode.

20 Claims, 6 Drawing Sheets

DIGITAL PHOTOGRAPHING APPARATUS, METHOD OF CONTROLLING THE SAME, AND RECORDING MEDIUM STORING PROGRAM TO EXECUTE THE METHOD

CROSS-REFERENCE TO RELATED PATENT APPLICATION

This application claims the priority benefit of Korean Patent Application No. 10-2009-0119103, filed on Dec. 3, 2009, in the Korean Intellectual Property Office, the disclosure of which is incorporated herein in its entirety by reference.

BACKGROUND

1. Field of the Invention

Embodiments relate to a digital photographing apparatus for obtaining an image in a user-desired mode regardless of whether a photographing mode is a moving image capturing mode or a still image capturing mode, a method of controlling the same, and a recording medium storing a program to execute the method.

2. Description of the Related Art

A digital photographing apparatus is used to lively record a desired moment by capturing an image. A digital photographing apparatus may capture a moving image or a still image according to a user's demand.

However, a digital photographing apparatus performs a moving image capturing operation and a still image capturing operation independently. That is, a moving image capturing mode has to be set when a user wants to capture a moving image and a still image capturing mode has to be set when the user wants to capture a still image. As such, a user may easily miss an appropriate timing for photographing a desired moment in a desired photographing mode due to misunderstanding of the photographing mode.

SUMMARY

Embodiments include a digital photographing apparatus that solves a problem that occurs when a moving image or still image capturing mode is misunderstood, a method of controlling the same, and a non-transitory computer readable storage medium having stored thereon a program executable by a processor for performing the method.

An embodiment includes a method of controlling a digital photographing apparatus capable of capturing a moving image and a still image. The embodiment of the method includes receiving a shutter signal from a user in a photographing mode; capturing a still image in correspondence to the shutter signal; capturing a moving image after the capturing of the still image is completed; and continuing a photographing operation by receiving from the user a selection of the capturing of the still image or the capturing of the moving image.

The photographing mode may be a moving image capturing mode.

The capturing of the still image may further include storing raw data of the captured still image.

The continuing of the photographing operation may further include performing image processing on the stored raw data and storing the image-processed data in a Joint Photographic Experts Group (JPEG) format if the capturing of the still image is selected.

The continuing of the photographing operation may include continuing the capturing of the still image if the shutter signal is input within a preset period of time after the capturing of the moving image is started; and continuing the capturing of the moving image if the shutter signal is not input within the preset period of time after the capturing of the moving image is started.

The photographing mode may be a still image capturing mode.

The capturing of the still image may further include performing image processing on the captured still image and then storing the image-processed still image in a JPEG format.

The continuing of the photographing operation may include continuing the capturing of the moving image if a first selection signal is input after the capturing of the moving image is started; and stopping the capturing of the moving image and continuing the capturing of the still image if a second selection signal is input after the capturing of the moving image is started.

The continuing of the capturing of the still image may further include immediately performing auto focus (AF) and auto exposure (AE) on a subject when the capturing of the still image is continued if the shutter signal is input after the second selection signal is input.

According to another embodiment, a non-transitory computer readable storage medium has stored thereon a program executable by a processor for performing the method.

According to another embodiment, a digital photographing apparatus that captures a moving image and a still image includes a manipulation unit that receives a shutter signal, a first selection signal, or a second selection signal according to a user's manipulation; and a control unit that controls the digital photographing apparatus to capture a still image in correspondence to the shutter signal input in a photographing mode, to capture a moving image after the capturing of the still image is completed, and to continue a photographing operation by receiving from the user a selection of the capturing of the still image or the capturing of the moving image.

The photographing mode may be a moving image capturing mode.

The control unit may store raw data of the captured still image in a buffer memory.

The control unit may perform image processing on the stored raw data and store the image-processed data in a memory in a Joint Photographic Experts Group (JPEG) format if the capturing of the still image is selected.

When the photographing operation is continued, the control unit may continue the capturing of the still image if the shutter signal is input within a preset period of time after the capturing of the moving image is started, and continue the capturing of the moving image if the shutter signal is not input within the preset period of time after the capturing of the moving image is started.

The photographing mode may be a still image capturing mode.

The control unit may perform image processing on the captured still image and then store the image-processed still image in a memory in a JPEG format.

The control unit may continue the capturing of the moving image if the first selection signal is input through the manipulation unit after the capturing of the moving image is started, and stop the capturing of the moving image and continue the capturing of the still image if the second selection signal is input through the manipulation unit after the capturing of the moving image is started.

The control unit may immediately perform auto focus (AF) and auto exposure (AE) on a subject when the capturing of the still image is continued if the shutter signal is input after the second selection signal is input.

Additional aspects and/or advantages will be set forth in part in the description which follows and, in part, will be apparent from the description, or may be learned by practice of the invention.

BRIEF DESCRIPTION OF THE DRAWINGS

The above and other features and advantages will become more apparent by describing in detail exemplary embodiments with reference to the attached drawings in which.

DETAILED DESCRIPTION

While exemplary embodiments are susceptible to various modifications and alternative forms, specific embodiments thereof are shown by way of example in the drawings and will herein be described in detail. It should be understood, however, that there is no intent to limit exemplary embodiments to the particular forms disclosed, but conversely, exemplary embodiments may include all modifications, equivalents, and alternatives falling within the spirit and scope of the invention. In the following description, a detailed description of known functions and configurations incorporated herein will be omitted when it may make the subject matter unclear.

It will be understood that, although the terms first, second, etc. may be used herein to describe various elements, these elements should not be limited by these terms. These terms are only used to distinguish one element from another.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," "including," "has," and/or "having" when used herein, specify the presence of stated features, integers, steps, operations, elements, and/or components, but do not preclude the presence or addition of one or more other features, integers, steps, operations, elements, components, and/or groups thereof.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Furthermore, the invention could employ any number of conventional techniques for electronics configuration, signal processing and/or control, data processing and the like. The word mechanism is used broadly and is not limited to mechanical or physical embodiments, but can include software routines in conjunction with processors, etc.

Hereinafter, exemplary embodiments will be described in detail with reference to the attached drawings.

A digital camera will be representatively described as an example of a digital photographing apparatus. However, the digital photographing apparatus is not limited to a digital camera and may also be applied to various digital devices such as a camera phone having a digital photographing function, a personal digital assistant (PDA), a portable multimedia player (PMP), a television (TV) and a digital picture frame.

Figure 1:
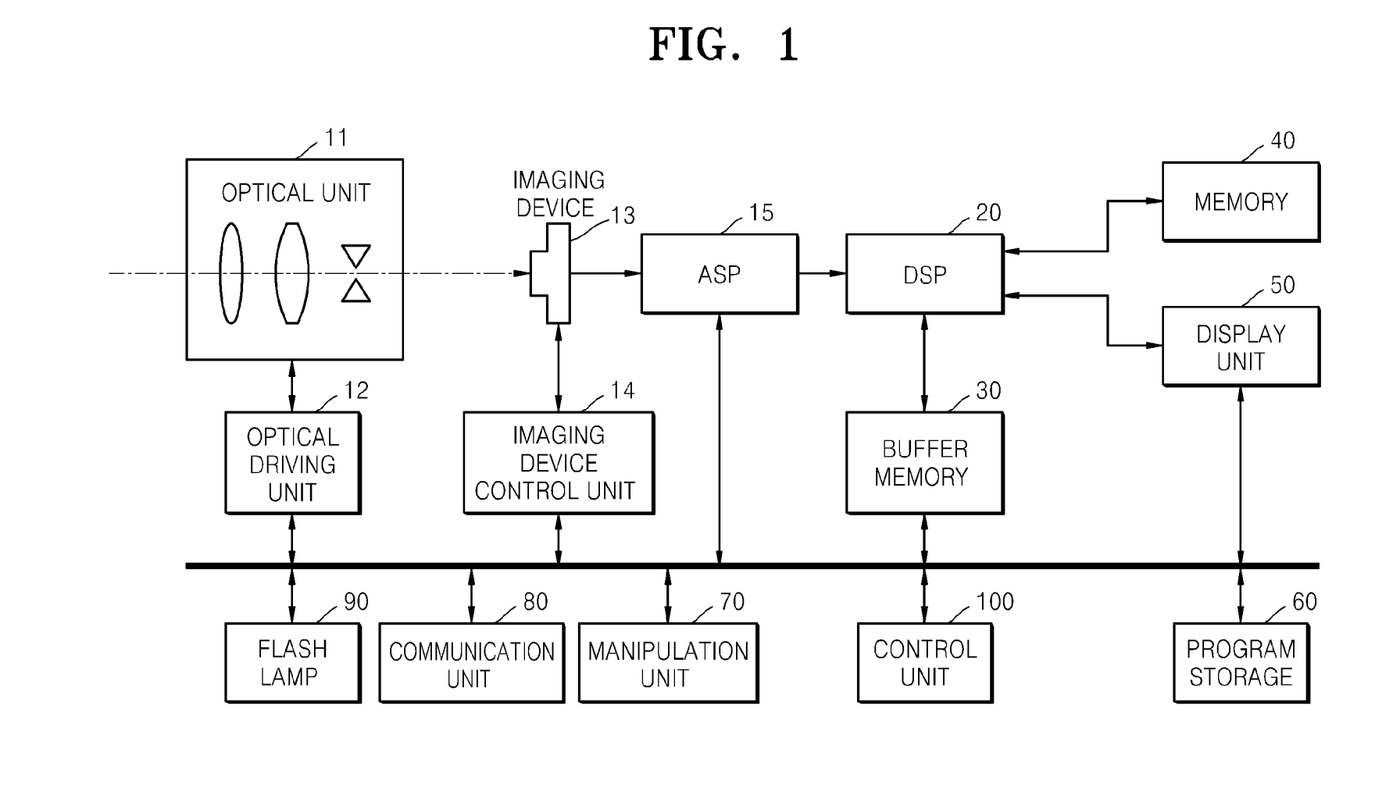
FIG. 1 is a block diagram of a digital photographing apparatus, according to an embodiment.

FIG. 1 is a block diagram of a digital photographing apparatus, according to an embodiment.

Referring to FIG. 1, the digital photographing apparatus includes an optical unit 11 that receives an optical signal from a subject, an optical driving unit 12 that drives the optical unit 11, an imaging device 13 that converts the optical signal received by the optical unit 11 into an electrical signal, an imaging device control unit 14 that provides a vertical synchronization signal to the imaging device 13, an analog signal processor (ASP) 15 that receives the electrical signal corresponding to one frame image in synchronization with the vertical synchronization signal received from the imaging device 13 and performs signal processing such as noise reduction or analog-to-digital (A/D) conversion on the electrical signal, and a digital signal processor (DSP) 20 that performs image signal processing on image data provided from the ASP 15. The image data may be input to the DSP 20 in real time or may be temporarily stored in the buffer memory 30 before being provided to the DSP 20. The digital photographing apparatus also includes a memory 40 that stores image data and information and a display unit 50 that displays an image. Also, the digital photographing apparatus may further include a program storage 60 that stores a program related to operation of the digital photographing apparatus, a manipulation unit 70 that inputs a manipulation signal of a user, a communication unit 80 that exchanges information with an external server or a terminal, and a flash lamp 90 that provides light. In addition, the digital photographing apparatus includes a control unit 100 that generally controls other elements according to the manipulation signal of the user or an input image.

Although all elements are illustrated as separate blocks in FIG. 1, this should not be construed as limiting. For example, two or more elements may be formed into one chip. Also, an element for performing two or more functions may be separated into two or more chips according to the functions.

The elements of the digital photographing apparatus will now be described in more detail.

The optical unit 11 may include a lens that obtains an optical signal, an iris that adjusts the intensity of the optical signal (light intensity), and a shutter that controls the optical signal to be input to the imaging device 13. The lens may include a zoom lens that increases or decreases a viewing angle according to a focal length and a focus lens that focuses on a subject. Each of the zoom and focus lenses may be formed as a single lens or a group of a plurality of lenses. The shutter may be a mechanical shutter that moves a lens shade up and down. In an embodiment, instead of including an additional shutter device, an electrical signal provided to the imaging device 13 may be controlled so as to function as the shutter.

The optical driving unit 12 that drives the optical unit 11 may control the position of the lens, opening or closing of the iris, operation of the shutter and the like so as to perform auto focus (AF), auto exposure (AE), aperture adjustment, zooming, focus changing and the like. The optical driving unit 12 may receive a control signal from the control unit 100 so as to drive the optical unit 11.

The imaging device 13 receives an optical signal input from the optical unit 11 so as to form an image of the subject. The imaging device 13 may include a complementary metal-oxide semiconductor (CMOS) sensor array or a charge-coupled device (CCD) sensor array. The imaging device 13 may provide image data corresponding to an image of one frame according to a timing signal provided from the imaging device control unit 14.

Since an electrical signal provided from the imaging device 13 is an analog signal, the ASP 15 may include an analog-to-digital (A/D) converter for converting the analog signal into a digital signal, and may also include a circuit for performing signal processing such as gain adjustment or waveform regulation on the electrical signal provided from the imaging device 13.

The DSP 20 may reduce noise from input image data and may perform image signal processing such as gamma correction, color filter array interpolation, color matrix, color correction or color enhancement so as to improve image quality.

The DSP 20 may generate an image file by compressing image data obtained by performing image signal processing on raw data of a still image temporarily stored in the buffer memory 30, or may restore the image data from the image file. A compression format may be a reversible format or an irreversible format. Appropriate examples of the compression format may be a Joint Photographic Experts Group (JPEG) format and a JPEG 2000 format. The compressed image file may be stored in the memory 40.

Also, the DSP 20 may functionally perform coloring, blurring, edge enhancement, image analysis, image recognition, image effect processing and the like. Image recognition may include face recognition, scene recognition and the like. Furthermore, the DSP 20 may perform image signal processing required to display an image on the display unit 50. For example, the DSP 20 may perform luminance level adjustment, color correction, contrast adjustment, edge enhancement, screen division, character image generation, image composition and the like.

The image data provided from the ASP 15 may be transmitted to the DSP 20 in real time or, if a data transmission speed is different from a calculation speed of the DSP 20, the image data may be temporarily stored in the buffer memory 30 before being provided to the DSP 20. The buffer memory 30 may include a memory device such as synchronous dynamic random access memory (SDRAM), a multiple chip package (MCP) or dynamic random access memory (DRAM).

The buffer memory 30 may temporarily store raw data of a still image captured in a moving image capturing mode.

The image data on which image signal processing is performed by the DSP 20 may be stored in the memory 40, or may be transmitted to the display unit 50 so as to be displayed as an image. The memory 40 may include a secure digital (SD) card, a micro memory card (MMC), a hard disk drive (HDD), an optical disk, an optical magnetic disk, a hologram memory or the like.

The display unit 50 displays the image of the image data on which image signal processing is performed by the DSP 20. In FIG. 1, the display unit 50 may include a touch screen for recognizing a touch input of the user. The touch screen may be additionally mounted on the surface of or may be embedded in a display device such as a liquid crystal display (LCD), an organic light emitting diode display (OLED) or a plasma display panel (PDP), and may be realized by using various methods such as a capacitance method, a resistance film method and an optical sensing method.

The program storage 60 may store, for example, an operating system (OS) and an application program used to operate the digital photographing apparatus. The program storage 60 may include electrically erasable programmable read-only memory (E2PROM), flash memory, read-only memory (ROM) or the like.

The manipulation unit 70 may include elements required when a user manipulates the digital photographing apparatus or manages various photographing setups. For example, the manipulation unit 70 may have a form of buttons, keys, a dial, a touch screen or the like and may input user manipulation signals such as power on/off, photographing start/stop, reproduction start/stop/search, optical system driving, mode change, menu manipulation and selection manipulation signals.

The manipulation unit 70 may receive a shutter signal, a first selection signal or a second selection signal according to the user's manipulation. The operation of the manipulation unit 70 will be described in detail later with reference to FIGS. 2 through 6.

The communication unit 80 may exchange information with an external server or a terminal by using a communication method such as a radio-frequency identification (RFID) or a wireless fidelity (WI-FI) wireless local area network (WLAN).

The flash lamp 90 may automatically operate by determining exposure information of an input image or may be manually operated according to the user's manipulation, so as to provide light for sufficient exposure or a special effect when the subject is photographed.

The control unit 100 may control other elements according to a program stored in the program storage 60 or may generally control other elements according to the user's manipulation signal input through the manipulation unit 70, an input image, a result of image processing performed by the DSP 20, or the like. In addition, by recognizing a touch input provided on the touch screen by the user, the control unit 100 may control operations such as power on/off, photographing start/stop, reproduction start/stop/search, optical system driving, mode change, menu manipulation and selection manipulation to be performed.

The control unit 100 may control the digital photographing apparatus to capture a still image in correspondence to a shutter signal input in a photographing mode, to capture a moving image after the capturing of the still image is completed, and to continue a photographing operation by receiving from the user a selection of the capturing of the still image or the capturing of the moving image. Operation of the control unit 100 will now be described in detail with reference to FIGS. 2 through 6.

Figure 2:
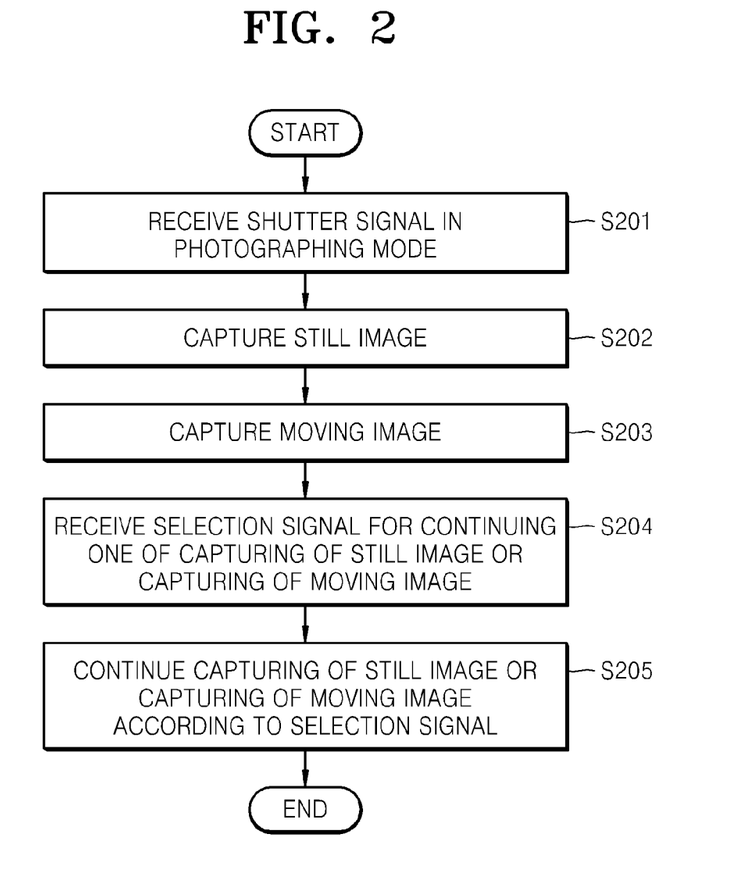
FIG. 2 is a flowchart for describing operation of a control unit of the digital photographing apparatus illustrated in FIG. 1, according to an embodiment.

FIG. 2 is a flowchart for describing operation of the control unit 100 of the digital photographing apparatus illustrated in FIG. 1, according to an embodiment.

Referring to FIG. 2, the digital photographing apparatus may capture a moving image and a still image. The control unit 100 receives a shutter signal from a user in a photographing mode (operation S201). Here, the photographing mode may be a moving image capturing mode or a still image capturing mode. The control unit 100 may control a preview image to be displayed on the display unit 50, and may receive a shutter signal according to an input of a button, a key or a touch on a touch screen in the manipulation unit 70.

A still image is captured in correspondence to the input shutter signal (operation S202) and a moving image is captured after the capturing of the still image is completed (operation S203).

While the moving image is captured in operation S203, the control unit 100 receives from the user a selection signal for continuing one of the capturing of the still image or the capturing of the moving image (operation S204). Here, the selection signal differs according to whether a current photographing mode is moving image capturing mode or still image capturing mode. The selection signal may be a shutter signal or another selection signal such as an OK signal of a menu button, or a first selection signal or a second selection signal that is input in correspondence to a question message displayed on a touch screen in the form of a pop-up window.

The capturing of the still image or the capturing of the moving image is continued according to the selection signal received in the operation S204 (operation S205).

A method of controlling a digital photographing apparatus will now be described in detail with reference to FIGS. 3 through 6.

Figure 3:
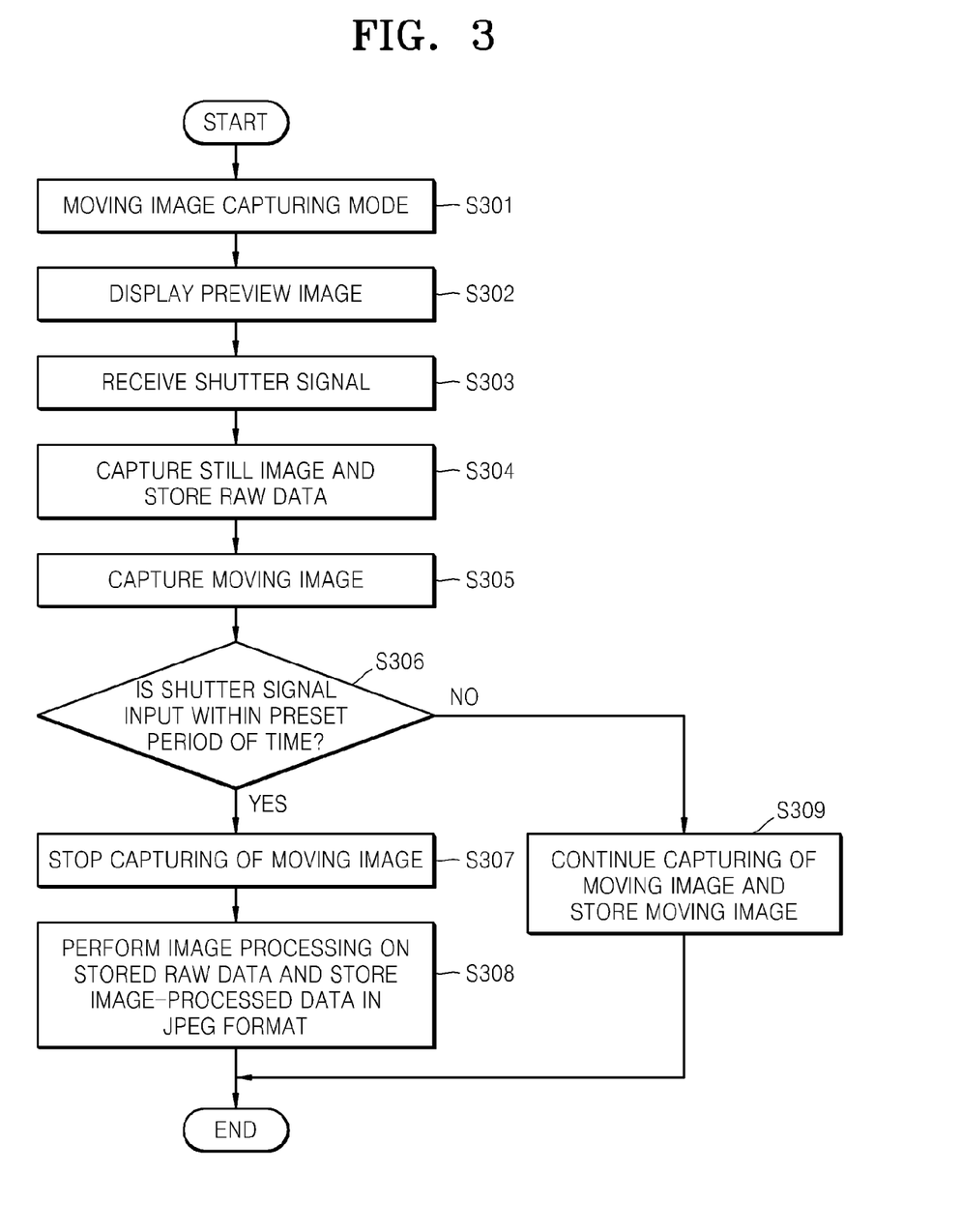
FIG. 3 is a flowchart of a method of controlling a digital photographing apparatus, according to an embodiment.

FIG. 3 is a flowchart of a method of controlling a digital photographing apparatus, according to an embodiment. FIG. 3 will be described in conjunction with FIG. 1.

In FIG. 3, the digital photographing apparatus may solve a problem that may occur when a user attempts to capture a still image without knowing a photographing mode is a moving image capturing mode. In brief, the digital photographing apparatus may obtain still image data according to user's demand by capturing a still image before capturing a moving image.

Referring to FIG. 3, the digital photographing apparatus is maintained in a moving image capturing mode (operation S301) and displays a preview image on the display unit 50 (operation S302).

The control unit 100 receives a shutter signal from the user (operation S303). In this case, the shutter signal may be a full shutter signal for capturing an image. Also, although not shown in FIG. 3, the control unit 100 may receive a half shutter signal for performing AF and AE on a subject before operation S303 is performed.

When the shutter signal is input, the control unit 100 captures a still image and stores raw data of the captured still image in the buffer memory 30 (operation S304).

In more detail, when the shutter signal is input, an input image recorded on the imaging device 13 is captured as a still image. The captured still image is provided to the ASP 15 and is not transmitted to the DSP 20 in real time. Instead, the raw data on which image processing is not performed is temporarily stored in the buffer memory 30. However, this should not be construed as limiting, as the raw data of the captured still image may be stored in the memory 40.

After the still image is captured in operation S304, the control unit 100 captures a moving image (operation S305).

The control unit 100 continues a photographing operation by receiving from the user a selection of the capturing of the still image or the capturing of the moving image. In more detail, the control unit 100 checks whether the shutter signal is input within a preset period of time after the capturing of the moving image is started (operation S306).

For example, if the shutter signal is input within 3 to 7 sec. after the capturing of the moving image is started, the control unit 100 continues the capturing of the still image. That is, the capturing of the moving image is stopped (operation S307) and already captured moving image data is not stored. Also, the raw data of the still image which is stored in the buffer memory 30 in operation S304 is transmitted to the DSP 20 so as to perform image processing, and is converted into a JPEG file so as to be stored in the memory 40 (operation S308). Then, a preview mode may be returned to continue the capturing of the still image.

Alternatively, for example, if the shutter signal is not input within 3 to 7 sec. after the capturing of the moving image is started, the control unit 100 continues the capturing of the moving image. That is, the capturing of the moving image which is started in operation S305 is continued (operation S309) and the captured moving image is stored, until an input signal for stopping the capturing of the moving image is received. In this case, the input signal for stopping the capturing of the moving image may be the shutter signal. Also, in this case, the raw data of the still image which is stored in operation S304 may be deleted according to the user's selection.

Typically, if a shutter signal is input in a moving image capturing mode (operation S301), the control unit 100 captures only a moving image. However, according to the current embodiment, a still image is captured in operation S304 before the moving image is captured in operation S305. Accordingly, even when a user presses a shutter button while misunderstanding a photographing mode as a still image capturing mode, a still image desired by the user may also be obtained.

Figure 4:
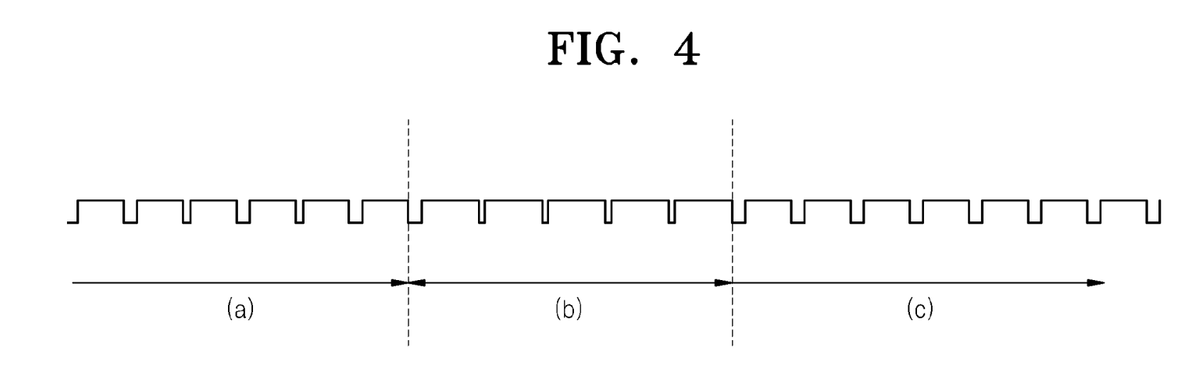
FIG. 4 illustrates waveforms of image signals output from an imaging device in the method of FIG. 3, according to an embodiment.

FIG. 4 illustrates waveforms of image signals output from an imaging device in the method of FIG. 3, according to an embodiment. The illustrated waveforms represent vertical drive waveforms, with which an image of one frame is output in one cycle. In particular, FIG. 4 illustrates signal waveforms output from the imaging device 13 to the ASP 15 when the imaging device 13 includes a CCD sensor array.

Referring to FIG. 4, a signal waveform is maintained as represented by (a) in a preview mode and then is changed as represented by (b) when a shutter signal is input and a still image is captured. Also, the signal waveform is changed as represented by (c) when capturing of a moving image is started immediately after the still image is captured. Although not shown in FIG. 4, if a shutter signal is input within a preset period of time after the capturing of the moving image is started, the preview mode for capturing the still image is returned. Otherwise, if the shutter signal is not input within the preset period of time, the capturing of the moving image is continued and thus the signal waveform represented by (c) is continued.

In FIG. 4, if the imaging device 13 includes a CCD sensor array, a resolution of one frame output from the imaging device 13 to the ASP 15 in a still image capturing mode is different from the resolution of a frame output in a moving image capturing mode. A resolution of a frame output in the preview mode or the moving image capturing mode is lower than the resolution of a frame output in the still image capturing. In an example, the resolution of a frame output in the preview mode or the moving image capturing mode is 720 progressive scan (p) which is a general high definition (HD) level, while the resolution of a frame output in the still image capturing mode is higher than 1080p which is a full HD level. In other embodiments, an image output from the imaging device 13 to the ASP 15 in the still image capturing mode may have a resolution different from that of a frame output in the moving image capturing mode or may have an array different from a Bayer array of a moving image.

Although a method of generating a still image by extracting a certain frame while storing and reproducing a captured moving image may be used, storing, reproducing and editing operations of a moving image have to be additionally performed every time a still image is generated, thus causing inconvenience and requiring a long time. In particular, when a still image is generated by extracting a certain frame of a moving image, since a resolution of a frame of a moving image is lower than that of a still image captured in a still image capturing mode, image quality is greatly reduced in comparison to a case when a still image is directly generated.

Accordingly, the method of FIG. 3 may solve the above problem and may facilitate obtaining a high-quality still image even when a user performs a photographing operation in a moving image capturing mode while misunderstanding a photographing mode as a still image capturing mode.

Although not shown in FIG. 4, in an embodiment in which the imaging device 13 includes a CMOS sensor array, a resolution of a frame output in a moving image capturing mode and the resolution of a frame output in a still image capturing mode are identically greater than 1080p. Accordingly, in this case, in addition to the method of FIG. 3, a still image may also be generated by extracting a certain frame while a captured moving image is stored and reproduced.

Figure 5:
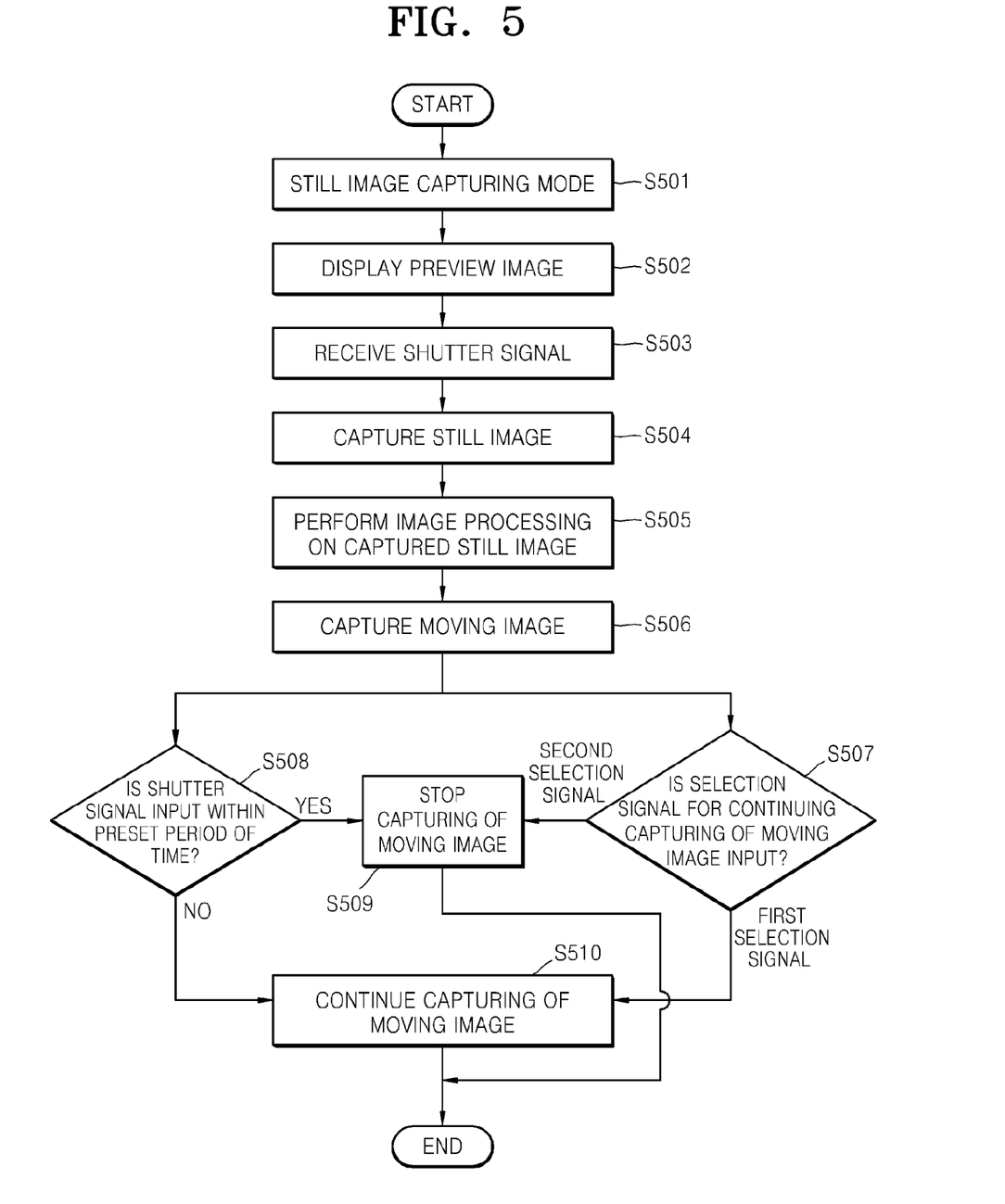
FIG. 5 is a flowchart of a method of controlling a digital photographing apparatus, according to another embodiment.

FIG. 5 is a flowchart of a method of controlling a digital photographing apparatus, according to another embodiment. FIG. 5 will be described in conjunction with FIG. 1.

In FIG. 5, the digital photographing apparatus may solve a problem that may occur when a user attempts to capture a moving image without knowing a photographing mode is a still image capturing mode. In brief, the digital photographing apparatus may obtain moving image data according to a demand of the user by capturing a moving image immediately after capturing a still image.

Referring to FIG. 5, the digital photographing apparatus is maintained in a still image capturing mode (operation S501) and displays a preview image on the display unit 50 (operation S502).

The control unit 100 receives a shutter signal from the user (operation S503). In this case, the shutter signal may be a full shutter signal for capturing an image. Also, although not shown in FIG. 5, the control unit 100 may receive a half shutter signal for performing AF and AE on a subject before operation S503 is performed.

When the shutter signal is input, the control unit 100 captures a still image (operation S504). Also, unlike the method of FIG. 3, the captured still image is image-processed, is converted to a JPEG format, and is then stored in the memory 40 (operation S505).

In more detail, when the shutter signal is input, an input image recorded on the imaging device 13 is captured as a still image. The captured still image is provided to the ASP 15 and is transmitted to the DSP 20 so as to perform image processing. After performing image processing and compression, the still image is converted to a JPEG format and then is stored in the memory 40.

Then, the control unit 100 captures a moving image (operation S506).

The control unit 100 continues a photographing operation by receiving from the user a selection of the capturing of the still image or the capturing of the moving image.

According to an embodiment, the control unit 100 continues the capturing of the moving image if a first selection signal is input after the capturing of the moving image is started, and stops the capturing of the moving image and continues the capturing of the still image if a second selection signal is input (operation S507).

For example, a pop-up window for asking whether to continue the capturing of the moving image may be displayed on the display unit 50 within a preset period of time (about 3 to 7 sec.) after the capturing of the moving image is started. The pop-up window may provide a question such as "Do you want to continue to capture a moving image?" and the user may select yes (Y) or no (N) as an answer. The first selection signal is input to the control unit 100 when the user selects yes (Y) by using the manipulation unit 70. The second selection signal is input to the control unit 100 when the user selects no (N) by using the manipulation unit 70.

If the first selection signal is input, the control unit 100 continues the capturing of the moving image (operation S510). Otherwise, if the second selection signal is input, the control unit 100 stops the capturing of the moving image (operation S509) and returns to a preview mode so as to continue the capturing of the still image. Here, if a shutter signal is input after the second selection signal input, AF and AE may be immediately performed on a subject when the capturing of the still image is continued. As such, when a still image is captured, processes of displaying a preview image and performing AF and AE when a half shutter signal is input may be omitted and thus a time required to perform a photographing operation may be reduced.

According to another embodiment, the control unit 100 checks whether a shutter signal is input within a preset period of time after the capturing of the moving image is started (operation S508).

For example, if the shutter signal is input within 3 to 7 sec. after the capturing of the moving image is started, the control unit 100 continues the capturing of the still image. That is, the capturing of the moving image is stopped (operation S509) and already captured moving image data is not stored. Also, the preview mode may be returned to continue the capturing of the still image.

Alternatively, for example, if the shutter signal is not input within 3 to 7 sec. after the capturing of the moving image is started, the control unit 100 continues the capturing of the moving image. That is, the capturing of the moving image which is started in operation S506 is continued (operation S510) and the captured moving image is stored in the memory 40, until an input signal for stopping the capturing of the moving image is received. In this case, the input signal for stopping the capturing of the moving image may be the shutter signal.

Typically, if a shutter signal is input in a still image capturing mode (operation S501), the control unit 100 captures only a still image. However, according to the current embodiment, a moving image is captured in operation S506 after the still image is captured in operation S504. Accordingly, even when a user presses a shutter button while misunderstanding a photographing mode as a moving image capturing mode, a moving image desired by the user may also be obtained.

Figure 6:
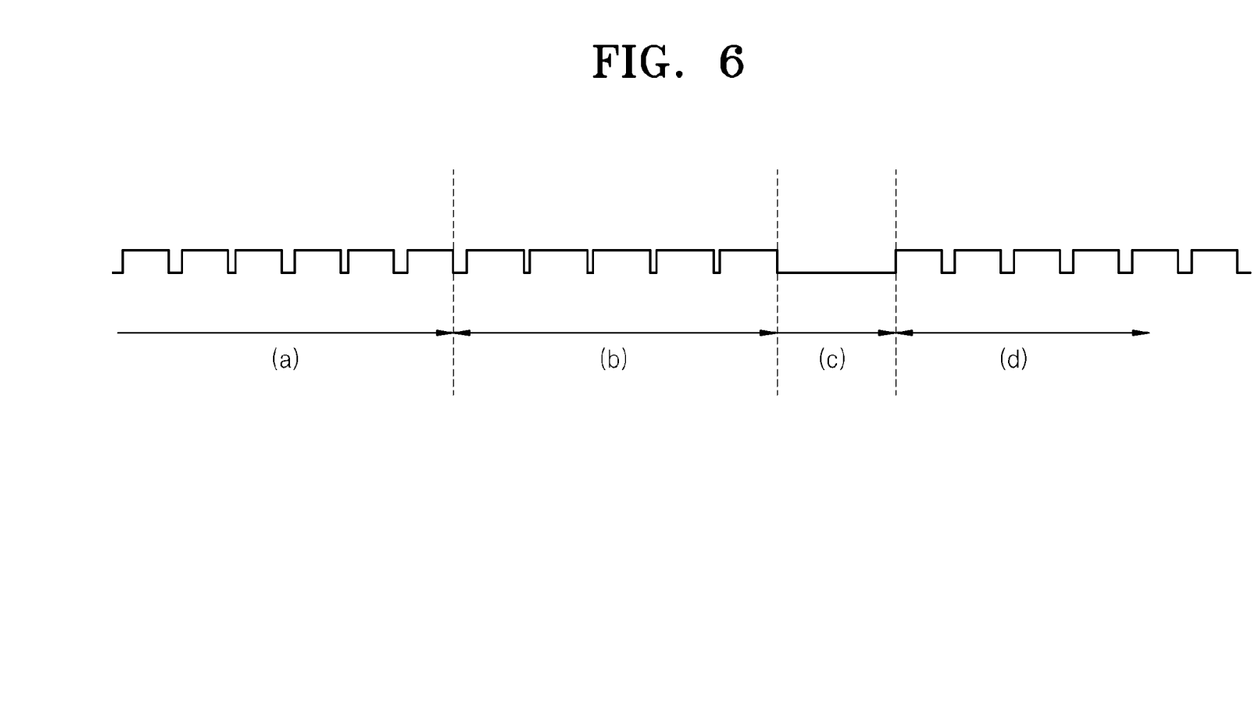
FIG. 6 illustrates waveforms of image signals output from an imaging device in the method of FIG. 5, according to an embodiment.

FIG. 6 illustrates waveforms of image signals output from an imaging device 13 in the method of FIG. 5, according to an embodiment.

The waveforms of the image signals in FIG. 6 are different from those in FIG. 4 in that image processing is performed after a still image is captured. Otherwise, FIG. 6 is the same as or similar to FIG. 4 and thus repeated descriptions will be omitted here.

Referring to FIG. 6, a signal waveform is maintained as represented by (a) in a preview mode and then is changed as represented by (b) when a shutter signal is input and a still image is captured. Since FIG. 6 is in a still image capturing mode, a time (e.g., about 200 ms) is required as represented by (c) to perform image processing after the still image is captured. Then, the signal waveform is changed as represented by (d) when capturing of a moving image is started. Although not shown in FIG. 6, if a shutter signal is not input or a first selection signal is input within a preset period of time after the capturing of the moving image is started, the capturing of the moving image is continued and thus the signal waveform represented by (d) is continued. Otherwise, if the shutter signal or a second selection signal is input within the preset period of time, the preview mode for capturing the still image is returned.

Embodiments of the invention may be applied to various image processing devices such as a digital camera, a camera phone and a digital camcorder.

As described above, according to various embodiments, an image may be obtained in a desired photographing mode even when a user misunderstands the photographing mode.

For example, a moving image may be obtained even when the user attempts to capture the moving image without knowing that a digital photographing apparatus in a still image capturing mode.

Also, a still image may be obtained at a desired moment even when the user attempts to capture the still image without knowing that the digital photographing apparatus in a moving image capturing mode.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

The connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated to be incorporated by reference and were set forth in its entirety herein.

While the invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the invention.

What is claimed is:

1. A method of controlling a digital photographing apparatus, and a digital photographing apparatus that captures a moving image and a still image, the method comprising:
   receiving an input shutter signal in a photographing mode;
   capturing a still image in correspondence to the input shutter signal;
   capturing a moving image after the capturing of the still image is completed;
   while capturing the moving image, displaying on a display unit a selection request for continuing a photographing operation of the capturing of the still image or the capturing of the moving image; and
   continuing the photographing operation of the capturing of the still image or the capturing of the moving image based on an input selection in response to the selection request.

2. The method of claim 1, wherein the photographing mode is a moving image capturing mode.

3. The method of claim 2, wherein the capturing of the still image further comprises storing raw data of the captured still image.

4. The method of claim 3, wherein the continuing of the photographing operation further comprises performing image processing on the stored raw data and storing the image-processed data in a Joint Photographic Experts Group (JPEG) format if the capturing of the still image is selected.

5. The method of claim 2, wherein the continuing of the photographing operation comprises:
   continuing the capturing of the still image if the input selection is input within a preset period of time after the capturing of the moving image is started; and
   continuing the capturing of the moving image if the input selection is not input within the preset period of time after the capturing of the moving image is started.

6. The method of claim 1, wherein the photographing mode is a still image capturing mode.

7. The method of claim 6, wherein the capturing of the still image further comprises performing image processing on the captured still image and then storing the image-processed still image in a JPEG format.

8. The method of claim 6, wherein the continuing of the photographing operation comprises:
   continuing the capturing of the moving image if a first selection signal is input in response to the selection request after the capturing of the moving image is started; and
   stopping the capturing of the moving image and continuing the capturing of the still image if a second selection signal is input in response to the selection request after the capturing of the moving image is started.

9. The method of claim 8, wherein the continuing of the capturing of the still image further comprises immediately performing auto focus (AF) and auto exposure (AE) on a subject when the capturing of the still image is continued if the shutter signal is input after the second selection signal is input.

10. A non-transitory computer readable storage medium having stored thereon a program executable by a processor for performing a method of controlling a digital photographing apparatus, and a digital photographing apparatus that captures a moving image and a still image, the method comprising:
- receiving an input shutter signal in a photographing mode;
- capturing a still image in correspondence to the shutter signal;
- capturing a moving image after the capturing of the still image is completed;
- while capturing the moving image, displaying on a display unit a selection request for continuing a photographing operation of the capturing of the still image or the capturing of the moving image; and
- continuing the photographing operation of the capturing of the still image or the capturing of the moving image based on an input selection in response to the selection request.

11. A digital photographing apparatus that captures a moving image and a still image, the method comprising:
- a manipulation unit that receives a shutter signal, a first selection, or a second selection according to an input;
- a display unit that displays a selection request for continuing a photographing operation of the capturing of the still image or the capturing of the moving image; and
- a control unit that controls the digital photographing apparatus to capture a still image in correspondence to the shutter signal input in a photographing mode, to capture a moving image after the capturing of the still image is completed, and to continue the photographing operation of the capturing of the still image or the capturing of the moving image based on an input selection in response to the selection request;
- wherein the display unit displays the selection request while capturing the moving image.

12. The apparatus of claim 11, wherein the photographing mode is a moving image capturing mode.

13. The apparatus of claim 12, wherein the control unit stores raw data of the captured still image in a buffer memory.

14. The apparatus of claim 13, wherein the control unit performs image processing on the stored raw data and stores the image-processed data in a memory in a Joint Photographic Experts Group (JPEG) format if the capturing of the still image is selected.

15. The apparatus of claim 12, wherein, when the photographing operation is continued, the control unit continues the capturing of the still image if the input selection is input within a preset period of time after the capturing of the moving image is started, and continues the capturing of the moving image if the input selection is not input within the preset period of time after the capturing of the moving image is started.

16. The apparatus of claim 11, wherein the photographing mode is a still image capturing mode.

17. The apparatus of claim 16, wherein the control unit performs image processing on the captured still image and then stores the image-processed still image in a memory in a JPEG format.

18. The apparatus of claim 16, wherein the control unit continues the capturing of the moving image if the first selection signal is input through the manipulation unit in response to the selection request after the capturing of the moving image is started, and stops the capturing of the moving image and continues the capturing of the still image if the second selection signal is input through the manipulation unit in response to the selection request after the capturing of the moving image is started.

19. The apparatus of claim 18, wherein the control unit immediately performs auto focus (AF) and auto exposure (AE) on a subject when the capturing of the still image is continued if the shutter signal is input after the second selection signal is input.

20. A method of controlling a digital photographing apparatus that captures a moving image and a still image, the method comprising:
- receiving an input shutter signal for capturing the still image in a photographing mode;
- capturing the still image in correspondence to the input shutter signal and storing a raw data of the still image;
- capturing the moving image after the capturing of the still image is completed;
- while capturing the moving image, displaying on a display unit a selection request for continuing a photographing operation of the capturing of the still image or the capturing of the moving image; and
- continuing the photographing operation of the capturing of the still image or the capturing of the moving image based on an input selection in response to the selection request.

* * * * *